July 12, 1960  A. PAALU  2,944,419
SPEED AND ACCELERATION DETECTION OF A ROTATING SHAFT
Filed May 10, 1956
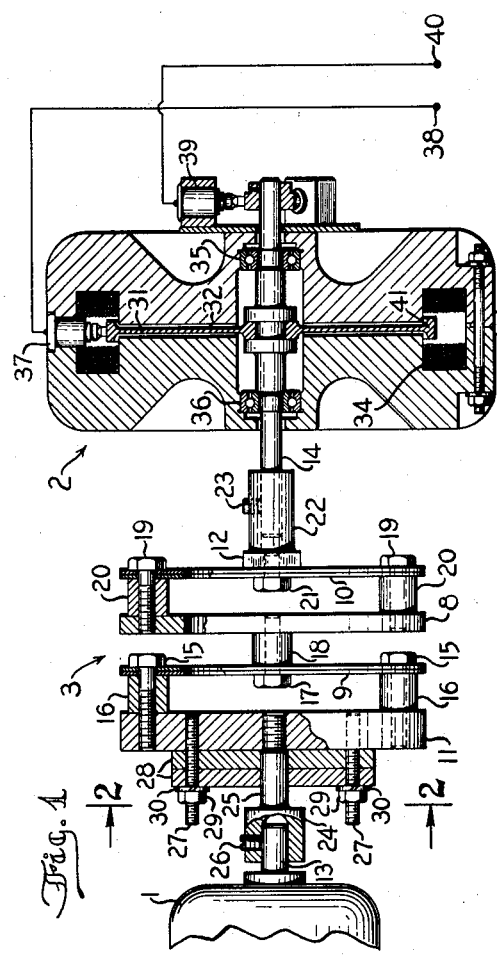
Fig. 4
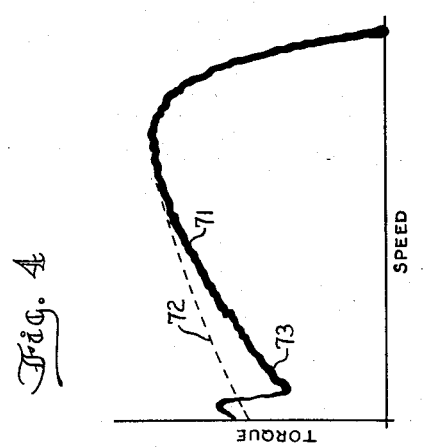
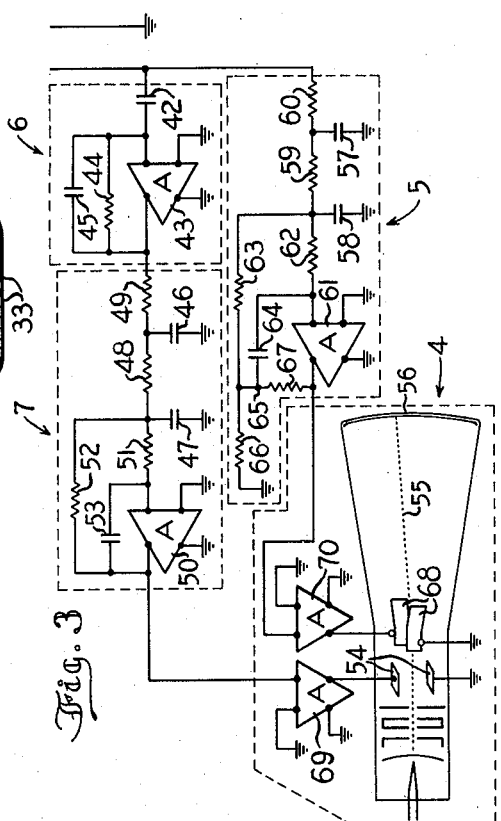
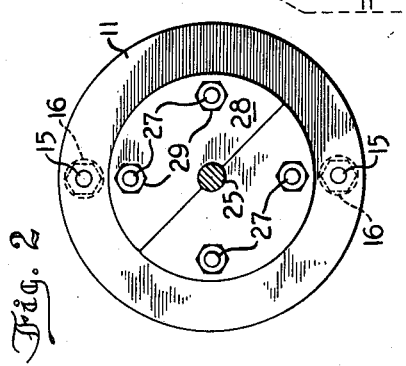
INVENTOR.
ALEX PAALU
BY *Andrus + Scales*
Attorneys

United States Patent Office 2,944,419
Patented July 12, 1960

2,944,419

SPEED AND ACCELERATION DETECTION OF A ROTATING SHAFT

Alex Paalu, Milwaukee, Wis., assignor to A. O. Smith Corporation, Milwaukee, Wis., a corporation of New York Filed May 10, 1956, Ser. No. 583,959

5 Claims. (Cl. 73—116)

This invention relates to the speed and acceleration detection of a rotating shaft and more particularly to such detection with electrical apparatus.

Generally, the speed and acceleration characteristics of a rotating shaft are determined by coupling the shaft to a tachometer generator to provide a voltage proportional to speed. This voltage is fed through a differentiating network to provide a voltage proportional to acceleration of the generator and therefore the driving shaft. The speed proportional voltage and the acceleration proportional voltage are connected in circuit with an electrically actuated detector to record the speed versus the acceleration of the generator and consequently of the driving shaft.

As the acceleration is proportional to torque, the speed versus torque characteristic is obtained. This is generally one of the most important characteristics of a rotating shaft and particularly for the shaft of a motor. Consequently, it is necessary that the results obtained be quite accurate and reliable.

When a conventional tachometer generator is employed to give the information voltage, proportional to speed and acceleration, undesirable interference voltages appear superimposed on the information voltage.

The interference voltages arise in part because of the commutation of the output voltage of the generator.

To avoid the commutation ripple voltage, a commutationless generator such as a homopolar generator may be employed rather than a conventional alternating current or direct current tachometer generator. Because the output of the homopolar generator is very small, amplification of the output signal is generally a necessity for best results.

Although the use of a homopolar generator eliminates the interference due to commutation, it has been found that other substantial interference voltages are superimposed upon the information voltages. These interference voltages apparently result from brush noise, brush bounce and thermal effects in the homopolar generator as well as inductive and capacitive coupling to the amplifier from external sources and the power circuit of the testing apparatus. The non-linear characteristic of the circuit elements may also be a source.

Further, the instantaneous values of torque in a single-phase motor are pulsating. Since the average torque is desired, means for elimination of the torque pulsation as well as the interference voltages is provided, leaving only the average value of torque.

Generally, the interference voltages due to brush noise and subsequent circuitry are of a substantially high frequency and can be removed by filtering. Nevertheless, if a filter circuit having a cutoff frequency which substantially eliminates the interference voltage is connected in circuit, it is often noted that a substantial portion of the information voltage is also lost. Or, when the necessary or desired information voltage is passed, then a certain amount of interference voltage is also passed.

In accordance with the present invention, the machine, under test, is inertia loaded to reduce the acceleration of the machine sufficiently to provide a signal having a frequency below the order of the lower interference voltages. The filter circuit is then designed for some reasonable cutoff of a frequency in the lower order of the normal frequency of the interference voltages. Now, with the rotating shaft inertia loaded to limit its acceleration, the signal or information voltage is below the cutoff frequency of the filter and the information voltage passes while the interference voltages are eliminated by the filter.

The drawing furnished herewith illustrates the best mode presently contemplated for carrying out the invention.

In the drawing:

Figure 1 is a vertical section of an embodiment of the invention coupled to a motor;

Fig. 2 is a view taken on line 2—2 of Figure 1;

Fig. 3 is a schematic electrical circuit; and

Fig. 4 is an illustration of a speed versus torque curve.

Referring to the drawings and particularly Figure 1, the embodiment of the invention is illustrated connected to a motor 1 and comprises, in general, a homopolar generator 2 connected in driven relation to the motor 1 by a variable-inertia coupling 3. The output of the generator 2 is connected to an oscilloscope 4 through two separate circuits. The first circuit includes a filter-amplifier 5 and supplies a voltage proportional to the speed of the generator. The second circuit includes a differentiating circuit 6 and a filter circuit 7 and supplies a voltage proportional to the rate of acceleration of the generator.

The coupling 3 comprises a rigid ring 8 centrally connected in series with a pair of flexible rings 9 and 10 respectively which are connected to a flywheel 11 and a strap member 12 respectively. The two latter are respectively connected to a motor shaft 13 and to the generator shaft 14.

The flexible ring 9 is secured at two diametrically opposed points to the flywheel 11 by a pair of bolts 15 which extend therethrough and thread into suitable tapped openings in the flywheel. Spacing members 16 encircle bolts 15 and maintain the flywheel 11 and ring 9 in axially spaced relation. Similarly, the ring 9 is secured to the central ring 8 by a pair of bolts 17 extending through openings in the ring 9, rotated ninety degrees from bolts 15, and threaded into suitably tapped openings in rigid ring 8. Spacing members 18, of which only one appears in Figure 1, maintain ring 9 and ring 8 in axially spaced relation. The other flexible ring 10 is also secured to the rigid central ring 8 by a pair of bolts 19 which extend through openings in the ring 10 and spacing members 20 and thread into tapped openings, rotated ninety degrees from bolts 17, in the rigid ring 8. Flexible ring 10 is also secured to the transverse strap member 12 by a pair of bolts 21 extended through the openings in the ring 10, rotated ninety degrees from bolts 19, and threaded in tapped openings in the strap member 12.

The strap member 12 is provided with a central hub 22 bored to accommodate the generator shaft 14 with a setscrew 23 locking the generator shaft 14 to the coupling 3.

To successively secure test motors to the coupling 3, a releasable chuck 24 is secured to a shaft 25 which is threaded into a suitable tapped opening in the center of the flywheel 11. The chuck 24 is illustrated as having a central recess to receive the shaft 13 and a setscrew 26 which threads radially into a tapped opening and bears on shaft 13 to securely grip the shaft 13 of the motor.

This coupling allows slight misalignment of the motor shaft 13 and generator shaft 14 without creating damaging stresses in the shafts and still provides rigid torsional coupling of motor shaft and generator shaft.

The flywheel 11 is also provided with a plurality of axially extended studs 27 to support one or more supplemental weight members 28. As more clearly shown in Fig. 2, the studs 27 are radially and circumferentially spaced about the center of the flywheel 11 to accommodate the flywheel supplements 28 which are provided with aligned openings. The studs 27 are each threaded to receive lock nuts 29 and washers 30 which secure the flywheel supplements to the flywheel. As illustrated, each flywheel supplement is a disc member formed of a pair of generally semi-circular halves, each of which has a central semi-circular recess on its diametrical edge.

The flywheel supplements 28 are employed to inertia load the motor and thereby reduce or limit the acceleration of the motor during the test, for reasons more fully explained hereinafter.

The illustrated generator 2 is a homopolar generator which comprises a disc-shaped rotor 31 secured electrically as well as physically to the drive shaft 14 which is coupled to the motor 1 as previously described. The rotor 31 rotates within an air gap 32 formed by a pair of axially spaced annular stator members 33 which includes a field winding 34 which is wound concentric to shaft 14 such that an axially directed magnetic field is established within the air gap. The shaft 14 is journaled in bearings 35 and 36 centrally disposed one to each stator member 33. The voltage is established in a radial direction between the outer periphery and the center of the rotor. To take off the generated voltage, three circumferentially spaced and interconnected brushes 37, of which only one is shown, slidably engage the outer periphery of the rotor to provide one output terminal 38 and three interconnected brushes 39, of which only one is shown, slidably connected to the shaft 14 to provide the second output terminal 40. Three brushes are preferably employed in each instance to insure continuous contact.

The outer periphery of rotor 31 is axially flared to provide an enlarged circumferential portion 41 upon which brushes 37 ride.

As previously noted, the output of the generator 2 is fed to a pair of circuits; one gives a speed proportional voltage and the other gives an acceleration proportional voltage.

The circuit providing a voltage proportional to the acceleration includes the differentiating circuit 6 which resolves the first derivative of the speed voltage. This voltage is directly proportional to the acceleration and therefore the torque output of the rotating shaft.

The differentiating circuit 6 includes a capacitor 42 connecting the generator output to the input of an amplifier 43. The amplifier 43 is any conventional high gain, phase inverting amplifier which amplifies low frequency voltages and/or direct current voltages. Thus as the input voltage increases in a positive direction, the output voltage increases in a negative direction and vice versa. A portion of the amplifier output voltage is fed back to the input of the amplifier by a parallel connected resistor 44 and capacitor 45. As previously noted, the input and output are in opposite phase relation and, consequently any change in the input voltage is, for all practical considerations, immediately nullified by an opposite and amplified change in the output feeding back to the input. The input voltage on the grid, not shown, of the amplifier 43 is therefore maintained at a practically unchanging potential and the output changes in direct proportion to the voltage changes across the capacitor 42 but in an opposite direction.

The capacitor 45 is of a small value and employed to suppress periodic oscillations and does not appreciably enter into or effect the differentiating operation as such.

The current through the capacitor 42 is proportional to the derivative of the voltage across it and if the potential of the grid, not shown, of the amplifier 43 did not change at all, the amplifier output, which varies inversely with the input from the capacitor 42, would be exactly proportional to the negative derivative of the input. The input in the present apparatus is the derivative of the generator output which, as previously described, is directly proportional to the generator speed and consequently the motor speed. The derivative of the speed voltage input is a voltage proportional to the acceleration. This gives an information voltage which is proportional to the acceleration or torque of the motor under test.

Interference or distortion voltages have been found to exist superimposed upon the information voltage. The interference voltages are generally of a substantially high frequency and arise in the brush connection, in the homopolar generator and from the power lines of the apparatus which normally are of the conventional 60 cycle alternating current variety. There is also a certain amount of interference voltage which arises in and is coupled to the amplifier circuit as previously noted.

To eliminate the various interference voltages which appear, the voltage output of the differentiator 6 is fed to a filter circuit 7 which is operative to remove substantially all extraneous signals which may have arisen through lead connections and brush pickup or in any other manner, as more fully described hereinafter.

As previously noted, it has been found that there is some overlapping in the frequency of the information signal and the interference signals. Thus, when the frequency cutoff of the filter circuit 7 is constructed to permit the desired information signal to pass, a certain portion of the unwanted voltages or signals also pass. The present invention substantially eliminates this overlapping of the desired and the undesired voltages by inertia loading the motor 1 so that the frequency spectrum of the acceleration voltage is substantially removed from the frequency spectrum of the interference voltages. This is done according to the present embodiment with the supplemental weights 28 which are added to the flywheel 11 to increase the inertia load on the motor until the desired acceleration is obtained.

A filter circuit 7 which has given highly satisfactory results and which is illustrated in the drawing is fully developed and described in an article by L. L. Rauch and E. E. Howe, entitled "Filters for Telemetry," published in 1953, National Telemetering Conference Record. The latter is a complete printing of the talks and papers presented at the 1953 National Telemetering Conference.

According to the noted article, the filter circuit presently to be described was developed by Mr. Rauch in 1949.

The filter circuit includes a section formed of a pair of capacitors 46 and 47 each having one terminal connected to ground and the other terminal connected to opposite ends of a resistor 48. The output of the differentiating circuit 6 is connected through a resistor 49 to the one terminal connecting the capacitor 46 and the resistor 48. The output of the $\pi$ section is connected to an amplifier 50 through a series connected resistor 51. The amplifier 50 is of any high gain, direct coupled variety which gives a negative output; that is, a phase inverter. A portion of the amplifier output is fed back to the amplifier input via a resistor 52 and a capacitor 53. The capacitor 53 is connected directly to the amplifier input whereas the resistor 52 is connected to the output of the $\pi$ section; i.e., to the input of the resistance 51.

The equations for determining the values of the capacitors and the resistances of the filtering circuit are taken from the previously entitled work. With a desired zero frequency gain, three limiting equations or conditions for the circuit are set forth therein, as follows:

(1) $\qquad A_1^2 - 2_2{}^A = 0$ (2) $\qquad A_2^2 - 2A_1 A_3 = 0$ (3) $\qquad A_3^2 = \dfrac{1}{W_c^6}$ where $W_c$ is the critical or cutoff frequency for voltages and, from previous derivation, where $A$, $A_2$ and $A_3$ are defined by the following equations respectively; with R and C representing a numerical value of the previously described resistors and capacitors, respectively, and being identified by a subscribe the same as the element number it represents.

(1)
$$A_1 = (R_{51} + R_{52})C_{53}$$
$$+ \frac{R_{51}R_{52}C_{53}}{R_{48}} + \frac{R_{49}R_{48}C_{46}}{R_{49}+R_{48}} - \frac{R_{49}R_{51}R_{52}C_{53}}{(R_{49}+R_{48})R_{49}}$$

(2)
$$A_2 = R_{51}R_{52}C_{47}C_{53}$$
$$+ \frac{R_{49}R_{48}R_{51} + R_{49}R_{48}R_{52} + R_{49}R_{51}R_{52}}{R_{49}+R_{48}} C_{46}C_{53}$$

(3)
$$A_3 = \frac{R_{49}R_{48}R_{51}R_{52}C_{46}C_{47}C_{53}}{R_{49}+R_{48}}$$

and where the desired zero-frequency gain is defined by the equation $$A = \frac{R_{52}}{R_{49}+R_{48}}$$

The present circuit is being employed as a filter circuit and consequently the most desired gain is one; that is, the ratio of output to input is to equal one.

The noted limiting equations along with the desired zero-frequency gain allows free choice of value of three of the seven circuit elements: resistors 48 49, 51 and 52 and capacitors 46, 47 and 53. The other four elements are then determined by the preceding equations.

The voltage output of the filter circuit 7 is connected in circuit with the Y-axis deflection plates 54 of the oscilloscope 4 and vertically deflects the electron stream or beam 55 in accordance with the changes in voltage. This in conjunction with the action of the speed responsive voltage subsequently described gives a trace of the speed vs. torque characteristic on the screen 56 of the oscilloscope.

The speed indicating circuit of the present embodiment of the invention comprises a low-pass filter which is a variation of that shown in the acceleration circuit.

The circuit comprises a π section with a pair of parallel connected capacitors 57 and 58 each having a terminal connected to ground and the other terminal connected to opposite ends of a resistor 59. The input to the π section is connected to the output of the generator through a resistor 60. The output from the π section is connected to an amplifier 61 through a resistor 62. The output of the amplifier 61 is fed back through a resistor 63 and a capacitor 64, with the capacitor 64 feeding back directly to the amplifier input with the resistor 63 feeding back to the input through the resistor 62. The resistor 63 and capacitor 64 are connected to the amplifier output at a junction 65 of a pair of series connected resistors 66 and 67 which are connected between the amplifier output and ground.

The feedback voltage is taken from the junction of the series connected resistors to reduce the percentage of the feedback and consequently obtain some amplification. The previous filter equations apply to the filter 5 with additional defining equations which are also given in the previously referred to article of L. L. Rauch and E. E. Howe:

(1) $\quad b=1$ (2) $\quad R_{66} = \frac{b}{b-1}(R_{52} - R_{63})$ (3) $\quad R_{67} = b(R_{52} - R_{63})$ where $R_{63}$ is of a value less than but approximately equal to $R_{52}$. In the additional equations $b$ is a constant, as set forth in the previously referred to article, and R refers to the value of the previously described resistors having the same number as the subscribe.

With the described filter circuit 5, the speed proportional voltage information is allowed to pass while the interference voltage is attenuated and blocked from the subsequent circuit.

The output of the filter circuit 5 is connected in circuit with the X-axis deflection plates 68 of the oscilloscope 4 and moves the beam 55 in a horizontal direction in proportion to the speed of the generator 2 and therefore of the motor 1 under test.

The oscilloscope 4 is a conventional variety having amplification means, shown as a pair of separate amplifiers 69 and 70, to suitably amplify the input.

Consequently, with the speed responsive voltage and the acceleration responsive voltage connected to the respective Y-axis and X-axis deflection plates 55 and 68, respectively, of the oscilloscope 4, the trace shown on the oscilloscope 4 is that of speed vs. torque characteristic of the motor 1 under test.

A generally typical speed vs. torque curve 71 for a motor 1 is shown in Fig. 4 of the drawing. The optimum speed vs. torque characteristic is shown by the dotted line 72 which merges with the actual curve 71 at higher speeds. The pronounced dip 73 in the actual curve 71 is due to the lack of skew of the rotor bars, not shown. This dip 73 can be substantially reduced by proper skew of the rotor bars, as is well known in the art.

If the one terminal of the generator 2, for example, as terminal 38, is grounded, the motor 1 should not be grounded. This is because in most motors there is a circulating current which flows along the motor shaft to the motor base or frame through one end bearing and returns to the shaft through the opposite end bearing. This produces a voltage drop through the bearing which would be carried through the coupling to the generator and appear in the generator output as an interference voltage. To eliminate this, the motor can be placed on an insulating platform or base; thereby breaking the return path to the base. The circuit can also be broken in any other suitable manner such as within the coupling.

Although the specific inertia loading apparatus and coupling as well as the specific differentiating and filtering circuits illustrated have given highly satisfactory results, any other similar functioning apparatus and circuits can be employed within the scope of the following claims.

The present invention provides a simple and easily adjusted method of accurately and electrically resolving the acceleration, and therefore the torque of a rotating shaft, with practically no interference with the information voltages.

Various modes of carrying out the invention are contemplated as being within the scope of the following claims particularly pointing out and distinctly claiming the subject matter which is regarded as the invention.

I claim:

1. Apparatus for determining the acceleration of a rotating shaft wherein interference voltages established in the apparatus are substantially eliminated from the output of the apparatus without appreciable loss of information, which comprises means connected in driven relation to said shaft to provide an electrical signal proportional to the speed of the shaft, differentiating means connected to said last named means to provide an electrical signal proportional to the rate of change of said first named electrical signal, a filter circuit connected to the differentiating means and being adapted to pass electrical signals of a predetermined frequency range and to attenuate electrical signals of a frequency other than the predetermined frequency range including interference signals arising in said apparatus, and inertia means connected between said first-named means and said shaft to inertia load the shaft to limit the rate of acceleration of the shaft and to thereby confine the first named electrical signal to a frequency within the predetermined frequency range.

2. Apparatus for determining the rate of acceleration of a rotating shaft wherein interference voltages having a known order of frequency are set up, which comprises a generator means coupled in driven relation to the rotating shaft, a differentiating circuit connected to the output of the generator means and adapted to provide an electrical signal proportional to the rate of change of the output of the generator means, a low-pass filter connected to the output of the differentiating circuit to substantially cutoff electrical signals above a frequency of the lower order of the distortion voltages, and inertia loading means adapted to be connected to the rotating shaft and said generator means for simultaneous rotation therewith to maintain the acceleration of the shaft below said predetermined frequency.

3. Apparatus for providing a speed-torque record of a dynamoelectric machine operating as a motor, which comprises a generator, a coupling connected to the generator and being adapted to be directly connected to the shaft of the dynamoelectric machine to provide an electrical signal directly proportional to the speed of the machine, an adjustable weight flywheel secured to the coupling to permit reduction of the acceleration of the dynamoelectric machine beneath a predetermined frequency, an electrical differentiating circuit connected to the generator output to provide an electrical signal proportional to the torque output of the machine, a low-pass filter circuit adapted to pass electrical frequencies below said predetermined frequency and to attenuate the electrical frequencies above said predetermined frequency, and electrical signal detecting means connected to the generator output and to the filter circuit output and adapted to provide a record of the speed-torque characteristic of the machine.

4. Apparatus for determining the speed-torque characteristic of a dynamoelectric machine operating as a motor wherein interference voltages of relatively high frequency are superimposed on the information voltage, which comprises a homopolar generator, a coupling having an adjustable weight flywheel and connecting the generator and the dynamoelectric machine, said flywheel being adjusted to maintain the acceleration of the machine and the generator below a predetermined frequency which is below the frequency spectrum of the interference voltages, a differentiating circuit connected to the output of the generator to provide an information voltage proportional to the acceleration of the generator and the machine, a low-pass filter connected to the output of the differentiating circuit to pass the information voltage and to block higher interference voltages, a filter connected to the generator output to pass a voltage proportional to speed and to block higher interference voltages, and voltage detecting means adapted to convert electrical signals to a physical trace and being connected to the output of said first and second named filters to provide a record of the speed-torque characteristic of the machine.

5. In a voltage actuated apparatus for providing a visual trace of the speed-torque characteristic of a motor wherein distortion voltages are superimposed upon information voltages said voltages having at least a partially common frequency range, a generator, a coupling having an adjustable weight flywheel and being adapted to connect the motor to said generator to drive the generator in synchronism with the motor to provide a voltage proportional to the speed of the generator, said flywheel being adjusted to substantially reduce the acceleration of the motor below said common frequency range, a feedback amplifier differentiating circuit connected to the output of the generator to provide an information voltage proportional to the torque output of the motor, an analog low-pass filter connected to the output of the generator to eliminate distortion voltages therefrom, an analog low-pass filter connected to the output of the differentiating circuit to eliminate the distortion voltages and to pass the information voltage, and an oscilloscope having electrically operated X-axis deflection means and electrically operated Y-axis deflection means connected one to the first named low-pass filter and the other to the second named low-pass filter to provide a visual trace of the speed-torque characteristic of the motor under test.

References Cited in the file of this patent

UNITED STATES PATENTS

| 2,208,648 | Schrader | July 23, 1940 |
| 2,363,611 | Newell | Nov. 28, 1944 |
| 2,637,204 | Short | May 5, 1953 |
| 2,674,125 | Eagan | Apr. 6, 1954 |